United States Patent Office 3,087,876
Patented Apr. 30, 1963

3,087,876
METHOD OF SINTERING URANIUM DIOXIDE
Courtland M. Henderson, Venia, Ohio, and James A. Stavrolakis, Pittsburgh, Pa., assignors to the United States of America as represented by the United States Atomic Energy Commission
No Drawing. Filed Mar. 13, 1958, Ser. No. 721,322
3 Claims. (Cl. 204—154.2)

This invention relates to a method of sintering formed uranium dioxide bodies to obtain a high density thereof.

Use of a ceramic such as uranium dioxide in fuel elements for nuclear reactors is well-established because of its chemical stability toward cladding materials and high temperature coolants, its high melting point, and resistance to radiation damage. The uranium dioxide fuel elements may be fabricated by conventional techniques such as cold pressing, hot pressing, hydrostatic pressing, extrusion and slip casting. Most of these compacting processes require a subsequent sintering operation to increase the density and strength of the green compact.

In the past the sintering operation has normally been accomplished in a hydrogen atmosphere. Prolonged heating at a relatively high temperature is required.

It is the object of the present invention to develop a method of sintering uranium dioxide which does not require the use of high temperatures.

We have found that uranium dioxide can be sintered in steam to a high density at a much lower temperature and in a shorter time than is required when the sintering is accomplished in a hydrogen atmosphere. Since uranium dioxide is unstable to an oxidizing atmosphere below 1200° C. but is stable to an oxidizing atmosphere above 1200° C., the bodies being sintered should be heated to above 1200° C. in a hydrogen atmosphere prior to the actual sintering step and after the sintering step should be cooled in hydrogen.

A further improvement in density is obtained by heating in air immediately preceding the steam sintering step following the heating in hydrogen step.

The following examples illustrate the advantages obtained by the present invention. In these examples uranium dioxide pellets prepared by cold pressing were sintered under different atmospheres.

*Table I*

| Green Density Percent of Theoretical (10.97) | Firing Conditions | Fired Density Percent of Theoretical (10.97) |
|---|---|---|
| 55 | 24 hrs., 1,400° C. in hydrogen | 70 |
| 55 | 1 hr., 1,400° C. in steam | 90 |

The first run used hydrogen throughout the firing cycle. In the second run hydrogen was used until the pellets reached 1400° C. After sintering for one hour under steam, the pellets were cooled in hydrogen. It should be noted that a density of 90% of theoretical was attained after only one hour firing in steam at only 1400° C.

Prolonged heating at a higher temperature is required to obtain a satisfactory density material according to the prior art method. For example, sintering in hydrogen at 1700° C. for 10 hours was required to attain a satisfactory product previous to the present invention. The advantage obtained by a pronounced reduction in time and temperature is obvious.

An additional improvement in density can be obtained by heating the pellets in air for about 40 minutes before they are sintered in steam. This improvement will be on the order of one or two percent.

It will be understood that this invention is not to be limited to the details given herein but that it may be modified within the scope of the appended claims.

What is claimed is:

1. A method of sintering uranium dioxide bodies comprising heating the body to above 1200° C. in hydrogen, sintering the body in steam, and cooling in hydrogen.

2. A method of preparing a ceramic body of uranium dioxide comprising fabricating the body, heating the body to above 1200° C. in hydrogen, sintering the body in steam for one to two hours at 1400° C. to 1500° C., and cooling in hydrogen.

3. A method according to claim 2 wherein the body is heated in air for 40 minutes prior to the steam sintering.

References Cited in the file of this patent

AEC Document MCW-7, Apr. 1, 1946, page 42. (Copy in Div. 46.)

WAPD-PWR-PMM-429 (Del.), Belle, Mar. 6, 1956, pp. 49-55. (Copy in Library.)

WAPD-PWR-PMM-491, Belle and Jones, Sept. 12, 1956, pp. 9, 11, 72-94. (Copy in Library.)

WAPD-PWR-PMM-904, Belle and Jones, Dec. 3, 1956, pp. 9, 10, 28, and 31. (Copy in Library.)

AEC Document, WAPD-MRP-66, PWR report for Dec. 24, 1956, to Feb. 23, 1957, pages 62-63. (Copy in Library.)

Evans et al.: Fabrication and Enclosure of Ruanium Dioxide, AEC Report HW-52729, Sept. 18, 1957, pages 16, 17, 18. (In Scientific Library.)

Report by Henderson, Read, and Stavrolakis, submitted by applicant as exhibit, dated "prior to Sept. 18, 1956."